United States Patent
Marsden et al.

[11] Patent Number: 5,925,201
[45] Date of Patent: Jul. 20, 1999

[54] METHOD AND APPARATUS FOR BONDING SPACERS TO CONDUCTORS

[75] Inventors: Harold I. Marsden, Holly Springs, N.C.; Nathan J. Kelley, Anderson, Ind.; Edward M. Petrie, Cary, N.C.

[73] Assignee: ABB Power T & D Company, Inc., Raleigh, N.C.

[21] Appl. No.: 08/926,021

[22] Filed: Sep. 9, 1997

Related U.S. Application Data

[51] Int. Cl.[6] .................................................. B32B 31/00
[52] U.S. Cl. ........................... 156/64; 156/294; 156/497; 428/398
[58] Field of Search ............................... 156/64, 82, 285, 156/287, 294, 359, 378, 497; 428/364, 397, 398

[56] References Cited

U.S. PATENT DOCUMENTS

| | | | |
|---|---|---|---|
| 2,122,335 | 6/1938 | Berman et al. | 156/244.14 |
| 2,988,240 | 6/1961 | Hardesty | 220/590 |
| 4,127,398 | 11/1978 | Singer, Jr. | 65/4 A |
| 4,361,451 | 11/1982 | Renaud | 156/64 |
| 4,511,426 | 4/1985 | Linnér | 156/497 |
| 4,594,275 | 6/1986 | Stolz | 428/36 |
| 4,968,367 | 11/1990 | Diderich et al. | 156/182 |
| 5,607,528 | 3/1997 | Choudhury | 156/73.2 |

OTHER PUBLICATIONS

Brochure entitled "Gas Insulated Transmission Bus" by ABB Power T&D Company Inc., Westborough, Mass., Aug. 1994, pp. 1–8.

*Primary Examiner*—James Sells
*Attorney, Agent, or Firm*—Burns, Doane, Swecker & Mathis, LLP

[57] ABSTRACT

In accordance with exemplary embodiments of the present invention, significant time reduction in the assembly of a conductive transmission line is achieved by using a novel assembly process to adhesively bond sleeves having adhesive channels formed therein to a hollow conductor. Exemplary embodiments are quick, easy and avoid any need to reexamine the inner conductor and components attached thereto for imperfections.

20 Claims, 3 Drawing Sheets

5,925,201

METHOD AND APPARATUS FOR BONDING SPACERS TO CONDUCTORS

BACKGROUND OF THE INVENTION

1. Field of the Invention

The present invention is generally directed to a method and apparatus for bonding spacers to conductors, such as hollow conductors used in high power transmission lines, whereby conductor segments are bonded together to form long transmission lines.

2. State of the Art

The efficiency of high voltage power transmission lines has been recently improved by using gas insulated cable line systems to replace conventional cable systems and overhead lines. Gas insulated cable systems are formed from hollow inner conductors suspended in a hollow conductive sheath. The hollow inner conductors are formed as interconnectable segments, whose sheaths can also be bonded together, to form a relatively long distance transmission line. A conductive transmission line system configured in this manner is the compressed gas insulated transmission (CGIT) bus system, available from Asea Brown Boveri (ABB) and described in the ABB product brochure entitled "Gas Insulated Transmission Bus".

An exemplary embodiment of a conductive transmission line configured as a gas insulated cable is illustrated in FIG. 1A. FIG. 1A shows a cross section of a hollow inner conductor 102 formed of a conductive material, such as an aluminum alloy. A sheath is formed as an outer conductor 104 that is concentrically located about the hollow inner conductor 102. Typically, the hollow inner conductor 102 is used to provide high voltage power transmission, while the outer conductor 104 is grounded to electrically shield the inner conductor 102. Both the hollow inner conductor 102 and the outer conductor 104 are formed in segments of predetermined lengths, such as 18 meter lengths. Both the hollow inner conductor 102 and the outer conductor 104 can be formed of any known conductive material, such as aluminum or aluminum alloys (e.g., aluminum/tin, or aluminum/magnesium).

To maintain high efficiency power transmission, the outer conductor 104 is spaced equidistant from the hollow inner conductor 102 at all locations about the periphery of the hollow inner conductor 102. Devices are provided on the periphery of the hollow inner conductor 102 at predetermined distances along its length to maintain a fixed separation distance between the outer periphery of the inner conductor 102 and the inner periphery of the outer conductor 104.

For example, FIG. 1A shows a cross-sectional view of a bracket formed as posts 110 located on a sleeve 108. The sleeve 108 is slid over the outer periphery of the hollow inner conductor 102 to a predetermined location along a length of the inner conductor. The sleeve 108 can be welded to the outer periphery of the hollow inner conductor 102. The bracket can be formed with any number (e.g., 3) of posts 110 extending from the sleeve toward an inner periphery of the outer conductor 104. The posts can be formed of any material including but not limited to filled epoxy (e.g., biphenyl epoxy). An outer end of each post 110 is typically formed with a movable element 112, such as a ball bearing, wheel or the like. After attachment of the sleeve 108 to an outer periphery of the hollow inner conductor 102, the outer conductor 104 can be slid into a concentric position about the hollow inner conductor 102, with the movable elements 112 serving as guides for maintaining an interior of the outer conductor 104 equidistant from an outer surface of the hollow inner conductor 102.

FIG. 1B shows a cross-sectional view of the FIG. 1A conductive transmission line along its longitudinal length. As shown therein, each of multiple sleeves 108 have plural posts 110. The sleeves are spaced equidistant from one another along a longitudinal length of a segment 118 of the conductive transmission line. In the exemplary FIG. 1B illustration, note that ends of the segment 118 are not configured with sleeves 108 having posts 110. Rather, a sleeve 108 which is mounted at either or both ends of segment 118 can be formed with cone 114 about its periphery. The cone is included in selected ends of selected segments 118 because the area 116 between an outer surface of the inner conductor 102 and an inner surface of the outer conductor 104, representing a gas compartment, is filled with a gas dielectric, such as sulpherhexofluoride (e.g., $SF_6$) nitrogen-sulpherhexofluoride mixture (e.g., $N_2SF_6$) or any other gas dielectric. The cone 114 serves as a gas barrier to prevent the gas dielectric included in one segment from leaking upon rupture of another segment of the conductive transmission line. The cones can be formed in a known manner using, for example, an epoxy with glass filler (e.g., silicone dioxide ($SiO_2$)).

As those skilled in the art will appreciate, although a conductive transmission line system such as that illustrated in FIGS. 1A and 1B provides relatively efficient transmission of power, a significant cost of these conductive transmission lines can be directly attributed to their installation in the field. More particularly, to provide flexibility during installation with respect to the arrangement of these conductive transmission lines, they are sent from a factory to the field with the hollow inner conductor and the outer conductor being provided separate of one another. In addition, the sleeves are not mounted to the inner conductor. That is, although the posts 110 are preattached to the sleeves 108, the sleeves 108 are not mounted to the hollow inner conductor 102 in the factory, but rather this mounting is implemented in the field.

These conductive transmission lines, when assembled, can traverse several hundred kilometers or more in length. The transmission lines are often installed above ground in cable trays or below ground by first trenching the earth in the place where the system is to be laid. The sleeves 108 having posts 110 and cones 114 are then welded to an outer periphery of the inner conductor, at predetermined separation distances along a length of the inner conductor 102. Afterwards, the outer conductor 104 is placed concentrically about the inner conductor 102 and sleeves 108. Once a given segment has been assembled, the segment is attached to another segment which has been assembled in similar fashion. This process is repeated until a desired length of the conductive transmission line has been assembled and installed.

In the foregoing assembly process, the sleeves 108 are welded in the field to the outer surface of the inner conductor 102. The welding of the cylindrical sleeves 108 to the outer surface of the hollow inner conductor 102 involves a 360° weld about the periphery on both ends of the sleeve. The entire inner conductor, the sleeves 108 and posts 110 must then be carefully examined to remove any imperfections due to the welding process.

The high percentage cost of installing the FIG. 1A system can be attributed to the lack of a controlled environment in the field, because this results in a higher number of imperfections. The removal of imperfections involves having a skilled assembler manually examine all outer surfaces of the segment to detect any high or low points which occurred as a result of welding. The assembler must machine and polish all surfaces to remove these imperfections (e.g., remove any high points using a lathe). During the welding process, solder can splatter onto the brackets, sleeves and exterior surfaces of the inner conductor to create imperfections which can significantly detract from the efficiency of the conductive transmission line and which must be removed. As those skilled in the art will appreciate, any imperfections which are not detected and addressed can stress the transmission line at that location, and can lead to shut down of the entire conductive transmission line. This, of course, results in significant costs and aggravation to both power providers and consumers.

As can be appreciated, installing a system as described with respect to FIGS. 1A and 1B is a time consuming and expensive process. Accordingly, it would be desirable to develop an assembly process for conductive transmission lines as illustrated in FIGS. 1A and 1B which can be cost-effectively and reliably implemented in the field, without detrimentally affecting the operability and efficiency of the conductive transmission line.

SUMMARY OF THE INVENTION

The present invention is directed to a method and apparatus for assembling conductive transmission lines in a cost effective, reliable, time efficient manner while at the same time enhancing the operability without degrading efficiency of the conductive transmission line. Exemplary embodiments of the present invention eliminate the labor intensive process of welding the sleeved spacing devices used to maintain precise separation distances between the outer surface of a hollow inner conductor and the inner surface of an outer conductor. Exemplary embodiments further eliminate the labor intensive and time intensive task of examining the inner conductor after the sleeves have been attached to the inner conductor.

In accordance with exemplary embodiments of the present invention, significant time reduction in the assembly of a conductive transmission line is achieved by using a novel assembly process to adhesively bond sleeves having adhesive channels formed therein to a hollow conductor. Exemplary embodiments are quick, easy and avoid any need to reexamine the inner conductor and components attached thereto for imperfections.

Generally speaking, exemplary embodiments of the present invention relate to a method for assembling a conductive transmission line comprising the steps of: locating at least a portion of a spacing element about an exterior portion of a first conductor of said conductive transmission line; applying adhesive to said at least a portion of a spacing element; and heating an interior of said first conductor to cure said adhesive and bond said spacing element to said first conductor.

Exemplary embodiments of the present invention are further directed to an apparatus, such as a sleeve having a bracket mounted thereon, for establishing a predetermined space between an outer periphery of a first inner conductor and an inner periphery of a second outer conductor used to form a conductive transmission line, said apparatus comprising: an adhesive inlet located on an exterior surface of said apparatus; a first interior annular adhesive channel located on an interior surface of said apparatus in operative communication with said adhesive inlet for dispersing adhesive applied to said adhesive inlet about an interior periphery of said apparatus; a second interior channel located about said interior surface of said apparatus; and a conductive membrane configured for placement in said second interior channel for establishing electrical contact between said apparatus and said first inner conductor.

BRIEF DESCRIPTION OF THE DRAWINGS

Other objects and advantages of the present invention will become more apparent from the following detailed description of preferred embodiments when read in conjunction with the accompanying drawings, wherein like elements are designated by like reference numerals, and wherein.

DETAILED DESCRIPTION OF PREFERRED EMBODIMENTS

Figure 1A:
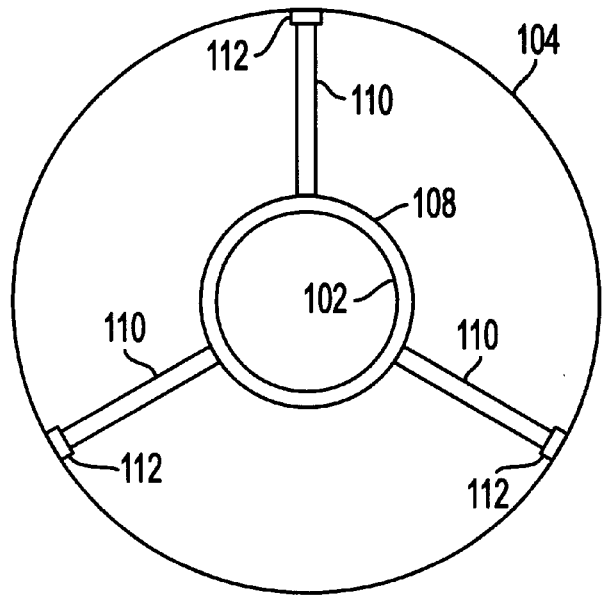
FIGS. 1A and 1B show cross-sectional views of an exemplary conductive transmission line.
Figure 1B:
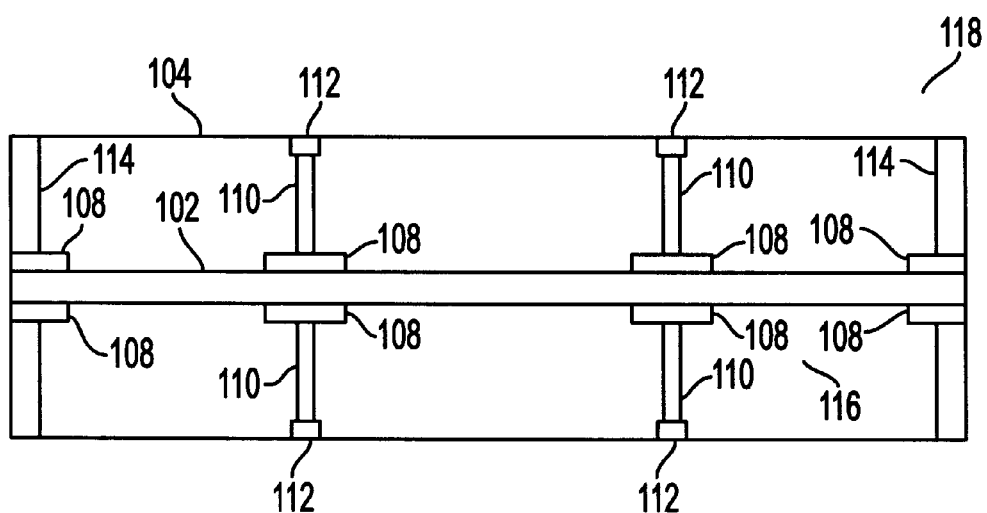
Figure 2A:
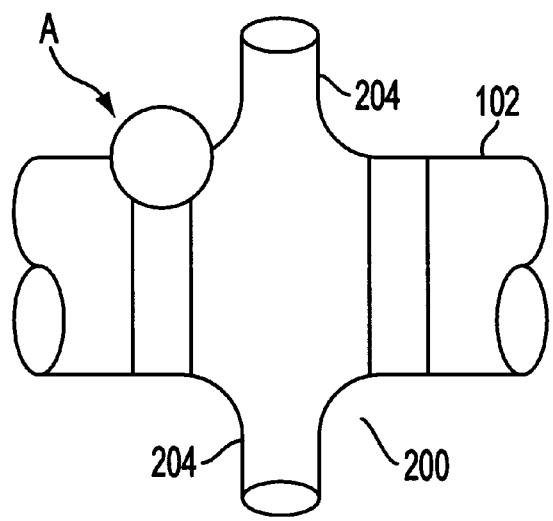
FIGS. 2A and 2B show a sleeve and bracket configured in accordance with an exemplary embodiment of the present invention.

To reduce the time and expense of assembling a conductive transmission line, such as the conductive transmission line of FIGS. 1A and 1B, exemplary embodiments use an apparatus such as the sleeve illustrated in FIG. 2A. Referring to FIG. 2A, a sleeve 200 is configured with a bracket having posts 204. The posts 204 are formed and attached to the sleeve 200 in any conventional manner. The sleeve 200 can be formed of materials used in accordance with conventional conductive transmission lines. For example, the sleeve 200 can be formed of any conductive material, such as aluminum or any aluminum alloy. The size of the sleeve can be configured in accordance with dimensions associated with conventional conductive transmission lines.

Features of the sleeve as modified in accordance with exemplary embodiments of the present invention will now be discussed. Afterwards, an exemplary method for assembling a conductive transmission line by attaching the sleeve 200 to the hollow inner conductor 102 will be discussed.

Figure 2B:
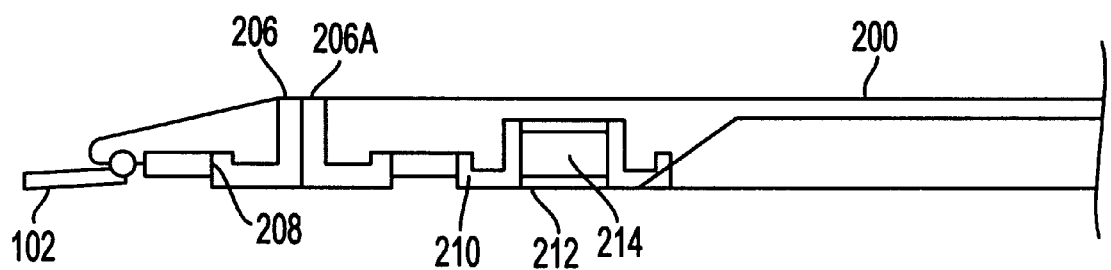

The section labelled "A" in FIG. 2A is exploded in FIG. 2B. FIG. 2B constitutes a cross-section of the sleeve 200 at the location "A" in FIG. 2A. That is, FIG. 2B illustrates a portion of the sleeve 200 which extends in a longitudinal direction along the length of the sleeve beyond the epoxy posts 204 which were preattached to the sleeve in FIG. 2A.

Referring to FIG. 2B, the sleeve can be seen to include at least one adhesive inlet 206 located on an exterior surface. The inlet 206 remains accessible after the sleeve has been placed concentrically about the hollow inner conductor 102. In the cross-sectional view of FIG. 2B, the adhesive inlet 206 can be seen to pass through the thickness of the sleeve 200, and into communication with a first interior annular adhesive channel 208. Of course, multiple adhesive channels can be located about the annular interior of the sleeve 200, with the channels being parallel to one another and in communication with one or more adhesive inlets (e.g., an adhesive inlet 206A can be formed separately of inlet 206). Although the interior annular adhesive channels extend continuously about the interior surface of the sleeve 200, those skilled in the art will appreciate that they can be segmented channels which do not completely encircle the sleeve's interior surface, provided each segmented channel has its own adhesive inlet so that adhesive can be applied into each of the various channel segments.

Instead of providing inlets for receiving the adhesive, the annular adhesive channels can be prefilled with an adhesive. For example, the adhesive channels can be prefilled with any of the adhesives described herein, and then protected using, for example, a removable barrier, such as polymer film or paper or any other material that can be removed from the adhesive once the sleeve is in place. For example, the barrier can be removed manually once the sleeve is in place.

In the exemplary FIG. 2B embodiment, two parallel interior annular adhesive channels 208 and 210 are illustrated, and both of these channels are shown to be in communication with a separate one of adhesive inlets 206 and 206A, respectively. Further, the darkened portion in each of the cross-sectional areas of these channels represents adhesive which has been injected therein via the adhesive inlets 206 and 206A. That is, adhesive has been supplied via the adhesive inlets 206 and 206A, which are in operative communication with the annular adhesive channels, for dispersing adhesive about interior surfaces of the sleeve.

In FIG. 2B, an additional interior channel 212 is illustrated. The additional interior channel 212 is also an annular channel located about an interior surface of the sleeve. In an exemplary embodiment, a conductive membrane 214 is configured for placement in the interior channel 212 for establishing electrical contact (i.e., electrical conductivity) between the sleeve 200 and the first inner conductor 102 once the sleeve has been placed about the exterior of the hollow inner conductor 102.

The conductive membrane 214 can be formed of any conductive material, including aluminum or aluminum alloys. Further, the conductive membrane 214 can be formed as a spring-like (e.g., coiled) structure. An axis about which the spring-like structure is formed coincides with an axis of the second channel 212, such that when the sleeve 200 is placed over the hollow inner conductor 102, the coils of the spring-like structure are compressed to fly establish electrical contact between the sleeve 200 and the inner conductor 102. In this manner, conductive contact between the sleeve 200 and an outer surface of the hollow inner conductor 102 can be ensured, even though adhesive injected into the annular adhesive channels may insulate portions of the sleeve from the inner conductor. The membrane 214 thereby avoids the adhesive from serving as a dielectric between the sleeve and the hollow inner conductor, and prevents a capacitive effect from occurring between the sleeve 200 and the inner conductor 102.

In an exemplary embodiment, an end of the sleeve opposite the end from which the detail "A" was obtained, is configured identically to the side from which the detail "A" was obtained. In other words, the sleeve 200 can be bonded at both of its longitudinal ends to the inner conductor 102.

Having described an exemplary embodiment of a sleeve with brackets in accordance with the present invention, a method for assembling the sleeve to the inner conductor will now be described. In accordance with an exemplary embodiment, the spacer element, formed as a sleeve having preattached posts, is slipped over an exterior surface of the inner conductor 102. In an exemplary embodiment, the inner conductor is of the type described in the background portion of the specification, and is, for example, formed of a metal alloy having a thickness within a range of 0.1 to 1 inch thick, or any other desired range. Although the sleeves described herein are cylindrical in shape, those skilled in the art will appreciate that any desired shapes can be used, provided an interior shape of the sleeve can be matched to whatever shape the inner conductor possesses.

In an exemplary embodiment, adhesive is applied to at least a portion of the spacing element. In an exemplary method, adhesive is applied after the sleeve has been located at a position along a longitudinal length of the inner conductor at which the sleeve is to be attached. Once the spacing element has been located at a desired location, adhesive can been applied to the adhesive inlet or inlets (e.g., inlets 206 and 206A). In an exemplary embodiment, the adhesive inlet is formed as a threaded inlet which can receive an adhesive injector nozzle. The injector nozzle is screwed into the adhesive inlet 106, and then activated (e.g., a plunger on the injector is depressed) to inject adhesive from an adhesive supply through the adhesive inlet and into at least a portion of the spacing element (e.g., the one or more interior adhesive channels located on an interior surface of the sleeve adjacent the inner conductor 102). This process is repeated for all the channels located in the sleeve. In alternate exemplary methods, prefilled adhesive channels as described previously can be used.

After the sleeve has been positioned on the inner conductor and adhesive has been injected to all desired adhesive channels, or alternately, the removable barrier protecting prefilled adhesive channels has been removed, the adhesive is cured to bond the sleeve to the channel. In accordance with exemplary embodiments, the adhesive maintains a viscous characteristic until its temperature is raised to some predetermined critical temperature.

In an exemplary embodiment, the adhesive can be any adhesive which maintains a level of viscosity prior to its heating to a critical temperature that is above typical ambient temperatures in the field where the conductive transmission line is to be assembled. For example, the adhesive can be an epoxy which is flexibilized such that it won't fall apart should it crack after curing. The adhesive can also be a fluorosilicone, or any other similar material. An exemplary adhesive which would be acceptable for use in conjunction with an exemplary embodiment of the present invention includes the products "EP 21 TDCHT", "Supreme 11HT", "Supreme 33", "Supreme 3HT" and "Supreme 10HT", all of which are available from Master Bond. Further, adhesives products such as "Product 326", "Product 510", "Product 518", "Product 609", and "Product 380" available from Loctite Corporation can also be used. For example, the Master Bond product "Supreme 11HT" has a thermal coefficient of expansion of $(50-55) \cdot 10^{-6}$ and a cure time of approximately 30 minutes at a temperature of approximately 120° celsius or greater. These parameters will, of course, vary depending on the adhesive selected.

After the sleeve has been located at a desired location along a length of the inner conductor and the adhesive has been injected, heat is applied to an interior of the inner conductor to cure the adhesive and bond the spacing element to the first conductor. In curing the adhesive, it is important to maintain a symmetric temperature field, because any thermal gradients that occur will result in stresses that become locked into the adhesive after it has been cured. Accordingly, exemplary embodiments of the present invention are further directed to generating a uniform heat field for rapidly heating the conductor/adhesive system to the critical temperature of the adhesive.

To minimize thermally induced stresses, heating of the system in an exemplary embodiment is conducted such that symmetric heating is achieved radially and minimal temperature gradients are experienced axially. Further, the entire length of the inner conductor is heated so that adhesive joints located along its entire length can be cured simultaneously.

In accordance with exemplary embodiment, the step of heating is performed by providing a temperature field using a fluid heat transfer medium, such as liquid, gas, or any mixture thereof, to provide intimate thermally conductive contact with the interior surface of the conductor. The rate at which energy is transmitted in this manner is governed by the temperature of the medium, its flow characteristics and thermodynamic properties. In the conductor/spacing element geometry, the radial wall thickness of the conductor is the shortest thermally conductive path through which heat can flow.

In accordance with an exemplary embodiment, rapid and controlled heating of the adhesive is used to create minimal thermal gradients both axially and radially in the conductor/adhesive joints associated with the sleeve and the inner conductor, and thereby cure multiple joints in a single action. Exemplary embodiments use radial conduction of heat through the conductor to cure the adhesive, and allow controllable heat input to accommodate different ambient temperatures and critical temperatures of the adhesive.

In an exemplary embodiment, heating is performed using a heat source, such as a hot air blower, to flow hot gas through the hollow interior of the inner conductor. This heat radially emanates to heat the inner conductor, and thus the adhesive located between an exterior surface of the inner conductor and an interior of each sleeve.

Exemplary embodiments achieve a temperature at an end of the inner conductor which is opposite an end at which the blower is located that equals the temperature associated with an end of the hollow inner conductor where the blower is located. As those skilled in the art will appreciate, as flow velocity of the gas is increased, any temperature differential between a temperature at an end of the inner conductor where the blower is located versus an opposite end of the inner conductor will be minimized. That is, flow velocity can be controlled to maintain comparable temperatures at either ends of the inner conductor. The exact flow velocity selected can be determined on a case-by-case basis, using empirical temperature measurements in the field to control flow velocity (e.g., temperature measurements at either end of the conductor can be used to adjust temperature and/or flow velocity of the heat source until desired temperatures and a desired temperature differential for opposite ends of the inner conductor are realized).

As mentioned previously, in curing the adhesive, it is desirable to avoid temperature gradients which can result in lost internal forces, and subsequent cracking of the adhesive. As those skilled in the art will appreciate, temperature is proportional to cure time. Using the adhesive described above, and a blower for supplying hot air through the hollow inner conductor 102 (e.g., a conductor having an outer diameter of one foot), cure time of the adhesive "Supreme 11HT" can be controlled to occur in approximately 15–30 minutes.

To provide further control of the curing process, resin can be included in the adhesive polymer, as is the case with the aforementioned "Supreme 11HT". The use of resin results in low radial thermal gradients, while enhancing long thermal gradients in an axial direction of the inner conductor to provide a uniform curing of the adhesive that reduces the effects of shrinkage, and that reduces locked-in stress. As a result, good reliability and reproducability that achieves high quality adhesive bonds can be realized.

Figure 3:
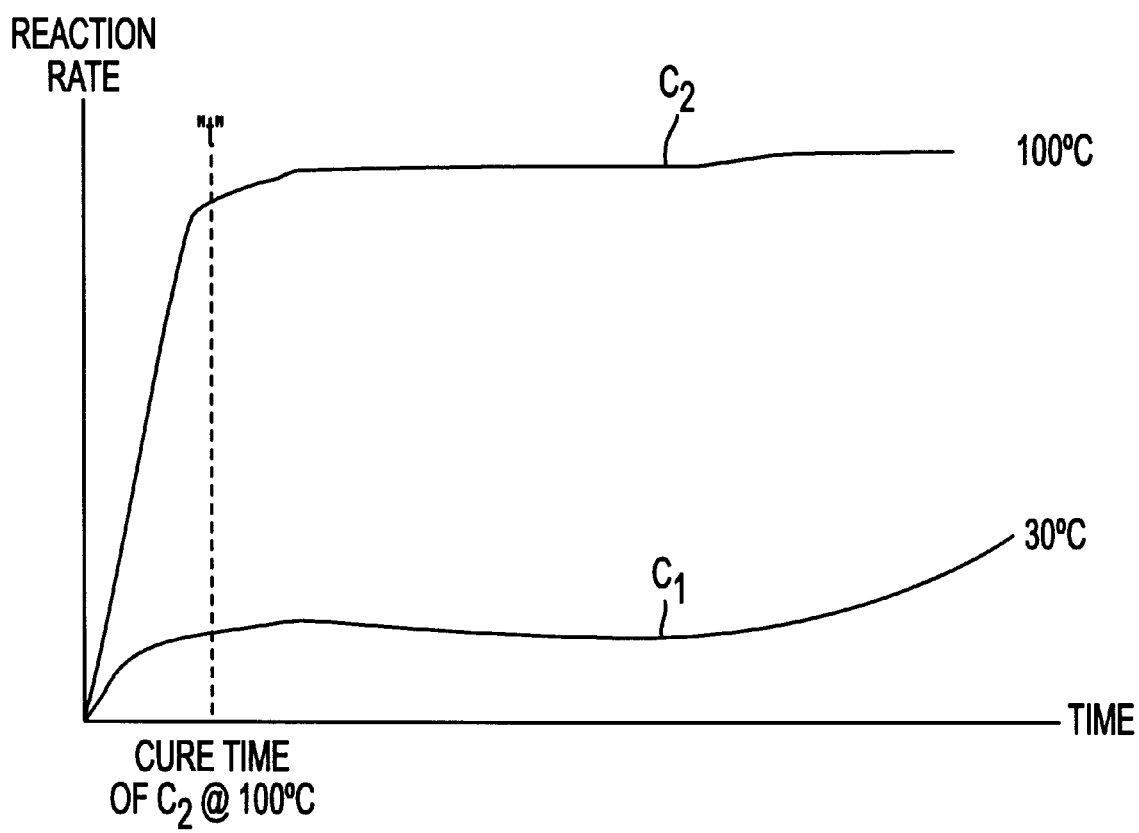
FIG. 3 shows an exemplary graph which depicts cure times of adhesives that can be used in accordance with an exemplary embodiment of the present invention.

With regard to the group of adhesives that can be used in accordance with exemplary embodiments of the present invention, reference is made to FIG. 3. In FIG. 3, time is shown along an x-axis, and reaction rate of the adhesive is shown along the y-axis. In response to a hot air blower outputting heat at approximately 30° celsius, the curve C, illustrates that an adhesive having an exemplary critical temperature of 100° C. will never completely cure. However, as the temperature of the hot air blower is increased to, for example, 110° celsius, a controlled reaction rate of the adhesive is achieved, and complete curing is performed in a relatively short time as represented by the dashed line z which intersects the curve $C_2$.

Although the sleeves described previously can be slid over an exterior surface of the inner conductor and then bonded into place via the adhesive and adhesive channels, those skilled in the art will appreciate that by increasing the surface area of the inner conductor used to bond with the sleeve, better adherence can be realized. Accordingly, in an alternate embodiment, an exterior surface of the inner conductor can be roughened, as can interior surfaces of the sleeve, in areas where the adhesive is to be applied. Afterwards, the adhesive can be applied and cured to achieve a more secure bonding.

Further, although a spring-like structure has been described for use as the membrane, those skilled in the art will appreciate that any type of spring-like device (e.g., heliocoil) can be used. That is, it is only necessary that some conductive material be provided in the second channel to ensure contact between the inner surface of the sleeve and the exterior of the hollow inner conductor to maintain electrical contact therebetween and avoid a capacitive effect from occurring due to the adhesive. Further, although exemplary materials for use in forming the membrane were described as being aluminum or an aluminum alloy, those skilled in the art will appreciate that any conductive material can be used including, for example, copper, copper-graphite, copper alloys or the like.

Further, those skilled in the art will appreciate that the exact manner of heating, and the temperature used for heating is a function of the adhesive selected and the desired cure time. In an exemplary embodiment, an output temperature of a blower used to heat a one foot diameter, 18 meter length inner conductor can produce a temperature output of approximately 500° celsius, and thereby easily achieve the 110° celsius temperature at an exterior surface of the inner conductor for curing the adhesive "Supreme "HT". An exemplary flow rate for achieving this curing can be determined in the field, taking ambient conditions into account. Those skilled in the art will appreciate other embodiments can also be readily implemented. For example, rather than using hot air, those skilled in the art will appreciate that steam or any other gas or heatable medium can be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalents thereof are intended to be embraced therein.

What is claimed:

1. Method for assembling a conductive transmission line comprising the steps of:

locating at least a portion of a spacing element about an exterior portion of a first conductor of said conductive transmission line;

applying adhesive to said at least a portion of a spacing element; and heating an interior of said first conductor to cure said adhesive and bond said spacing element to said first conductor.

2. Method according to claim 1, wherein said step of applying further includes a step of:

injecting adhesive into an interior adhesive channel of said spacing element after locating said at least a portion of said spacing element about said exterior portion of said first conductor.

3. Method according to claim 2, wherein said step of injecting is repeated with respect to plural interior adhesive channels of said spacing element.

4. Method according to claim 2, wherein said step of injecting is repeated with respect to a plurality of spacing elements located along a length of said first conductor.

5. Method according to claim 1, wherein said step of heating further includes a step of:

supplying a source of heat to an interior of said first conductor.

6. Method according to claim 5, wherein said source of heat includes at least one of hot air and steam.

7. Method according to claim 5, wherein said step of heating is performed to simultaneously cure adhesive for bonding a plurality of said spacing elements to said first conductor.

8. Method according to claim 1, wherein said step of heating further includes a step of:

controlling a temperature and flow velocity of heat through said interior of said first conductor to control a cure rate of said adhesive.

9. Method according to claim 1, further including a step of:

placing a second conductor of cylindrical shape concentrically about said first conductor and said spacing element subsequent to said step of heating.

10. Method according to claim 1, wherein said adhesive is applied prior to locating said at least a portion of said spacing element about said exterior portion of said first conductor.

11. Apparatus for establishing a predetermined space between an outer periphery of a first inner conductor and an inner periphery of a second outer conductor used to form a conductive transmission line, said apparatus comprising:

a first interior annular adhesive channel located on an interior surface of said apparatus for dispersing adhesive about an interior periphery of said apparatus;

a second interior channel located about said interior surface of said apparatus; and a conductive membrane configured for placement in said second interior channel for establishing electrical contact between said apparatus and said first inner conductor.

12. Apparatus according to claim 11, further including:

an adhesive inlet located on an exterior surface of said apparatus wherein said adhesive inlet is threaded to receive a device for supplying adhesive to said first interior annular adhesive channel.

13. Apparatus according to claim 11, further including:

a plurality of additional interior annular adhesive channels on said interior surface of said apparatus.

14. Apparatus according to claim 11, wherein said first interior annular adhesive channel is located at a first end of said apparatus, said apparatus further including:

a second interior annular adhesive channel located at a second end of said apparatus opposite said first end.

15. Apparatus according to claim 11, wherein said second interior channel and said conductive membrane are located at a first end of said apparatus, said apparatus further including:

another conductive membrane located at a second end of said apparatus opposite said first end.

16. Apparatus according to claim 11, wherein said conductive membrane is a coil-like structure.

17. Apparatus according to claim 11, further including:

a non-conductive post for establishing a fixed separation distance between said first inner conductor and said second outer conductor.

18. Apparatus according to claim 11, further including:

an adhesive located within said first interior annular adhesive channel.

19. Apparatus according to claim 18, wherein said adhesive is a flexible epoxy.

20. A conductive transmission line comprising:

a first inner conductor having a hollow interior;

a second outer conductor sized for concentric placement about said first inner conductor; and a spacing element for establishing a predetermined space between an outer periphery of said first inner conductor and a peripheral interior of said second outer conductor, said spacing element further including:

a first interior annular adhesive channel located on an interior surface of said spacing element for dispersing adhesive about an interior periphery of said spacing element;

a second interior channel located about said interior surface of said spacing element; and a conductive membrane configured for placement in said second interior channel for establishing electrical contact between said spacing element and said first inner conductor.

* * * * *